United States Patent [19]

Lemaire et al.

[11] Patent Number: 4,697,695

[45] Date of Patent: Oct. 6, 1987

[54] CONVEYOR FOR CONTAINERS

[75] Inventors: Didier V. Lemaire, Vernouillet; Jean-Marc Dronet, Putanges Pont Ecrepin, both of France

[73] Assignee: E.P. Remy & Cie, France

[21] Appl. No.: 825,630

[22] Filed: Feb. 3, 1986

[30] Foreign Application Priority Data

Oct. 28, 1985 [FR] France .................... 85 15997
Dec. 17, 1985 [FR] France .................... 85 18713

[51] Int. Cl.⁴ .................................. B65G 29/00
[52] U.S. Cl. ........................ 198/803.15; 198/476.1; 53/282
[58] Field of Search ............... 53/201, 202, 267, 281, 53/282, 247, 368, 300, 369, 329; 198/473.1, 476.1, 803.11, 805.15

[56] References Cited

U.S. PATENT DOCUMENTS

| | | | |
|---|---|---|---|
| 2,245,263 | 6/1941 | Dostal | 198/803.15 X |
| 2,815,622 | 12/1957 | Barrett | 53/247 X |
| 3,224,162 | 12/1965 | Scollard et al. | 53/247 |
| 3,819,194 | 6/1974 | Grevich et al. | 198/803.15 X |
| 3,908,340 | 9/1975 | Erhardt | 53/329 X |
| 3,965,656 | 6/1976 | Gerben | 53/329 X |
| 3,981,389 | 9/1976 | Babunovic et al. | 198/803.15 |
| 4,098,058 | 7/1978 | Carrigan | 53/281 X |
| 4,199,050 | 4/1980 | Moller | 53/247 X |

*Primary Examiner*—Robert L. Spruill
*Assistant Examiner*—Steven P. Weihrouch
*Attorney, Agent, or Firm*—Steinberg & Raskin

[57] ABSTRACT

The present invention relates to a conveyor for containers comprising two chains carrying transverse members each constituted by an assembly of links hingedly connected to each other and to the chains to constitute deformable parallelogram linkages into which can be inserted containers (R) of any shape and size while at the same time ensuring the centering of the containers.

13 Claims, 14 Drawing Figures

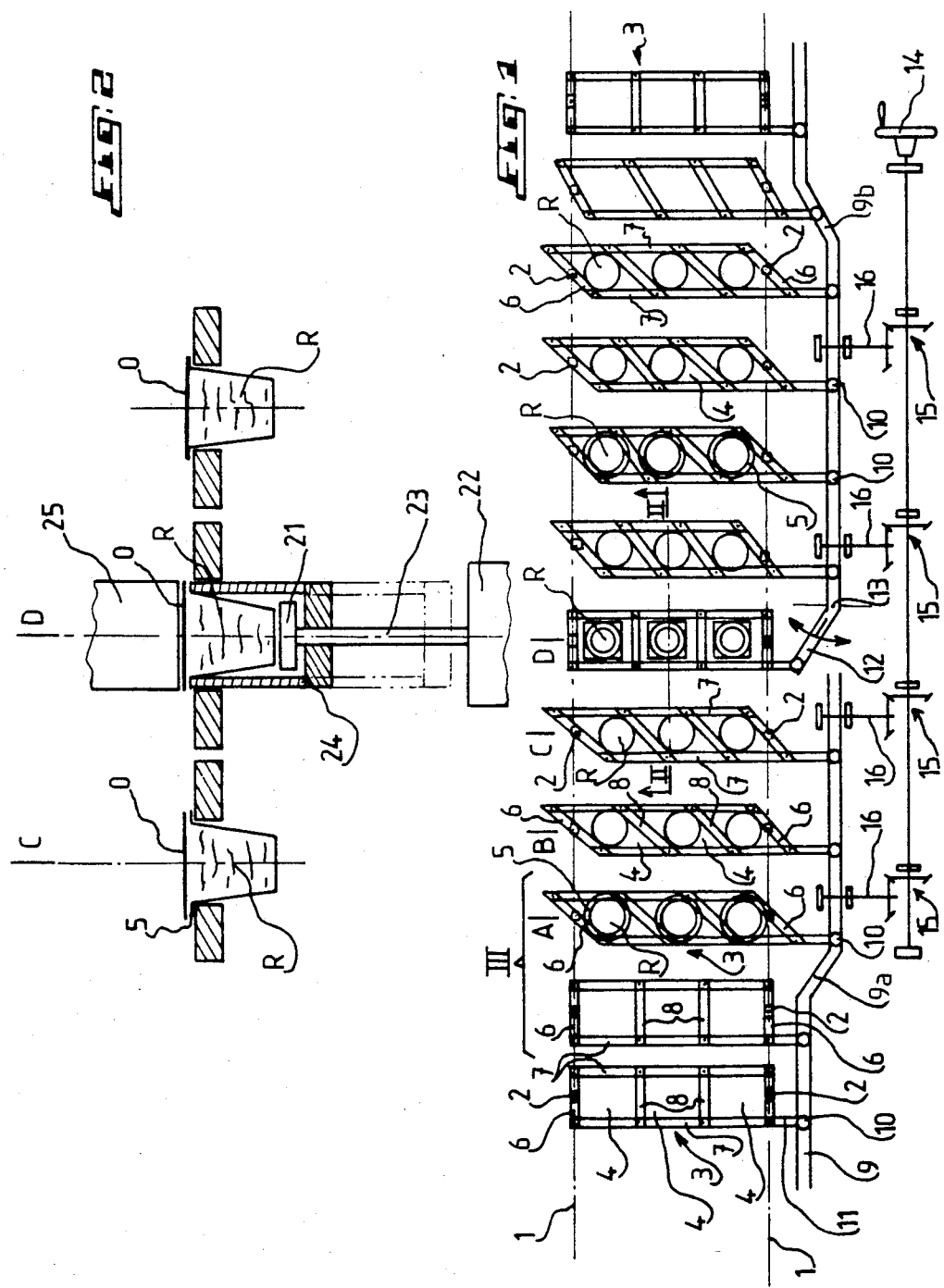

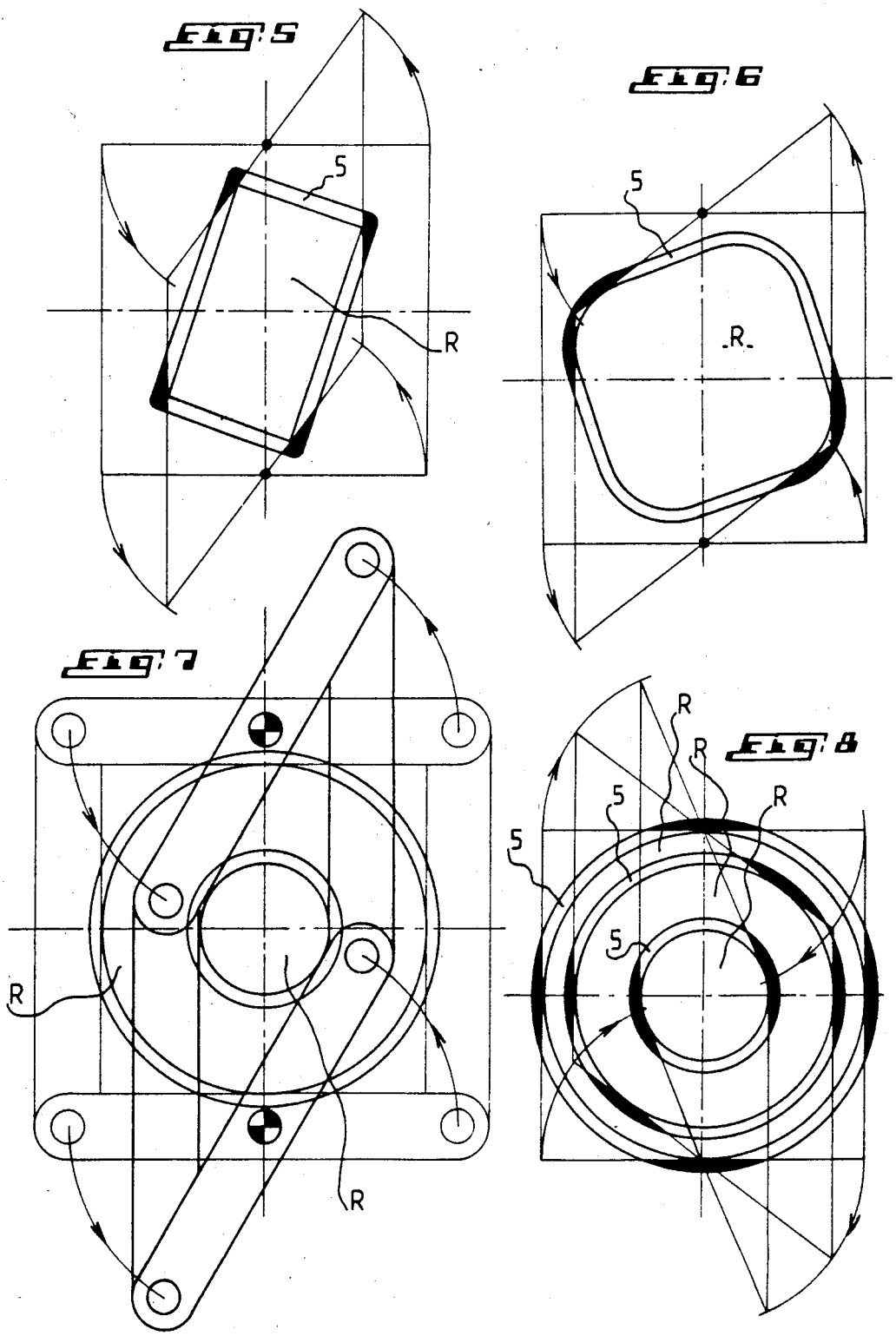

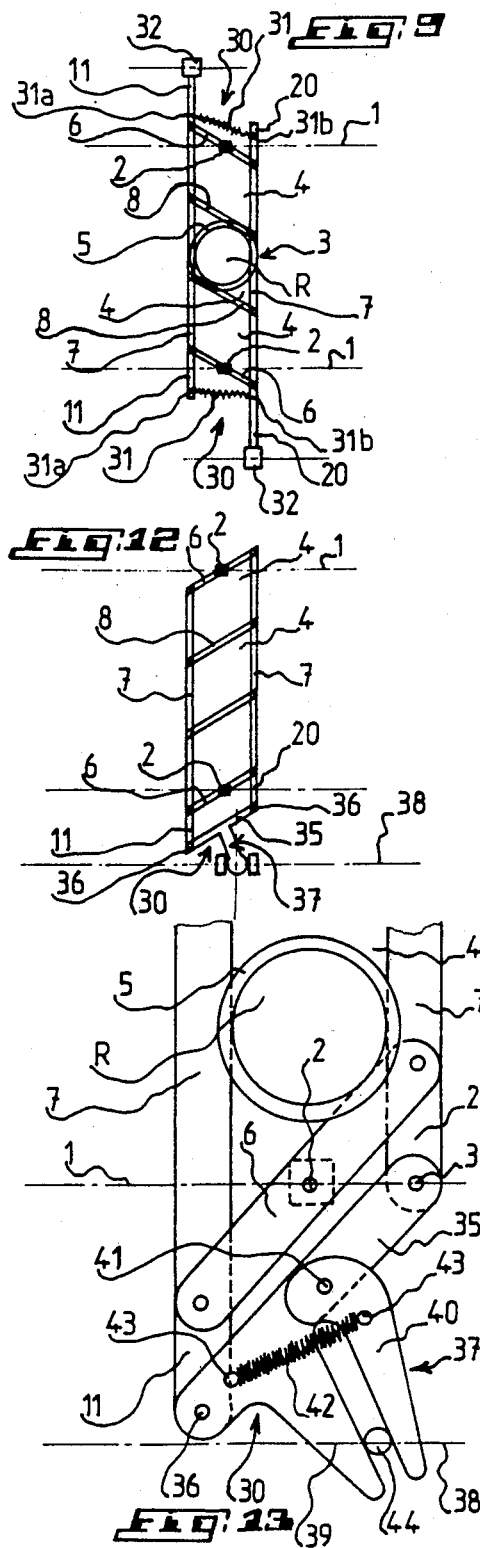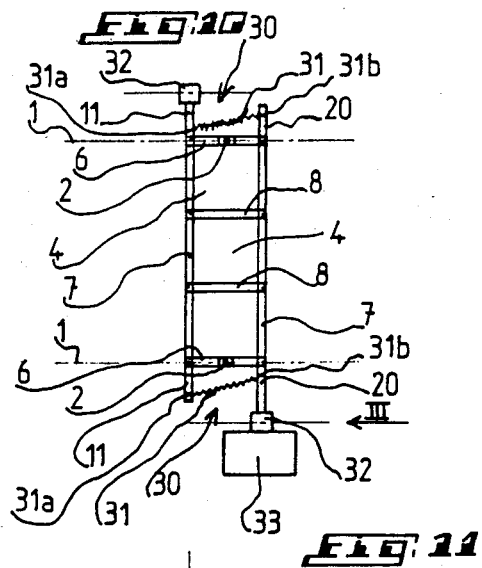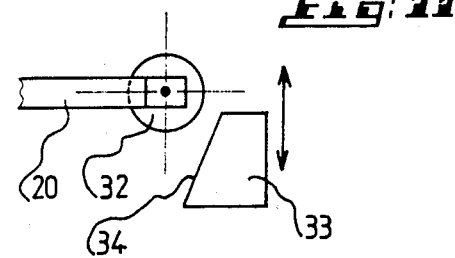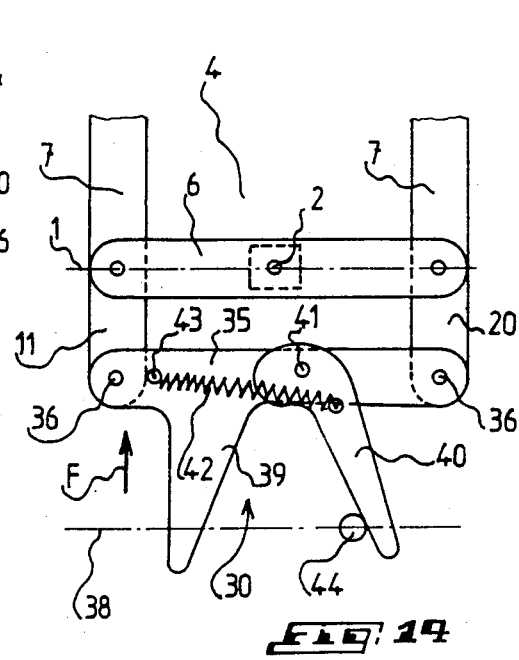

CONVEYOR FOR CONTAINERS

BACKGROUND OF THE INVENTION

The present invention has essentially for a subject matter a conveyor for containers, such as for example cups.

Machines are already known which include a conveyor for containers intended to receive for example any food product, the said machines allowing automatic filling and convering of the containers.

The conveyor was hitherto constituted by two endless chains provided with cross-plates connected to both chains and provided with openings adapted to receive and retain the cups by their edges.

Thus, the conveyor allowed the carrying of successive rows of cups which ran past various successive processing stations located above the conveyor.

Understandably, the cross-plates provided with the openings are only suitable for containers of a quite definite diameter. When the containers to be processed are of a different shape or a different diameter, it is of course necessary to replace all the cross-plates by other plates provided with openings corresponding to the new shape or size of the containers which it is desired to process. This, understandably, requires considerable and very expensive work, to say nothing of the fact that as many sets of cross-plates should be available as there are shapes of containers to be processed, which is hardly practicable.

SUMMARY OF THE INVENTION

The present invention therefore has as its purpose to remedy the above drawbacks by providing a new conveyor for containers which may be called universal, since it is almost instantaneously adaptable to a great variety of container shapes and sizes.

To this end, the invention has for a subject matter a conveyor for containers, such as for example cups, of the type including two endless chains or the like provided with transverse members connected to both chains and adapted to receive containers which are thus carried by the chains, characterized in that the transverse members are each constituted by an assembly of links hingedly connected to each other and to the chains to define one or more deformable parallelogram linkages into which containers of any shape and dimensions can be inserted.

According to another feature of the invention, the parallelogram linkage or linkages of each transverse member is or are deformable by means extending in substantially longitudinal relationship to the conveyor and actuating at least one of the links.

It is therefore understood that the deformable parallelogram linkages can be easily opened to the required degree so as to retain containers of any shape and size. It is therefore very easy to change over from the processing of a series of containers of a certain shape to the processing of another series of containers of another shape. Moreover, whatever the container shape, diameter or size, the containers always remain perfectly centered with respect to the various working stations located above the conveyor.

According to one example of embodiment, the actuating means for the deformation of the parallelogram linkages are constituted by a rail, a slide guide or any other like means which is adjustable in a perpendicular relation to the longitudinal direction of the conveyor and in which is adapted to roll or slide a member, such as for example a roller, connected to one of the links.

Furthermore, at least a portion of the said adjustable rail may be movable with respect to the other portion of the rail by being for example hingedly connected to the said other portion.

According to one feature of the invention, there is provided a second, stationary rail, slide guide or the like extending in substantially parallel relationship to the said adjustable rail or slide guide and also co-operating with a member, such as for example a roller, connected to a link.

The said second rail advantageously acts as a swivel support means for the parallelogram linkages, so that their deformation caused by the displacement of the said adjustable rail has no effect on the conveyor chains.

According to still another feature of the invention, the deformable parallelogram linkages constituting each transverse member consists of four, hingedly connected links forming a first parallelogram linkage including two opposite sides hingedly connected to the two chains, respectively, whereas other links are hingedly connected between the other two opposite sides of the first parallelogram linkage to thus define a plurality of parallelogram linkages each adapted to receive a container.

Furthermore, the roller co-operating with the adjustable rail is arranged on one of the said other two opposite sides of the first parallelogram linkage, preferably at the end of an extension of the said side.

As for the roller co-operating with the stationary rail, it is arranged on a hingedly connected link connecting the end of the said extension to an extension of the second other opposite side of the first parallelogram linkage.

According to still another feature of the invention, the conveyor is fitted with vertically movable supports located below the upper side of the conveyor and adapted to receive the containers and to pass through the deformable parallelogram linkages in open position.

The said supports may be for example located straight below a stationary heat-sealing head located above the upper side of the conveyor and to which the supports are applied to weld a cover on the opening of the containers.

This ensures a perfect welding of the covers to the cup edges.

According to another form of embodiment of the conveyor of the invention, the actuation of the deformable parallelogram linkage or linkages is performed by at least one active member connecting the extensions of two opposite sides of the parallelogram linkage or linkages.

The said active member may be constituted by a means for returning the parallelogram linkage or linkages to closed position, such as for example a spring or a simple resilient connection, whereas means are provided to act on the parallelogram linkage or linkages against the action of the return means to open the said parallelogram linkage or linkages.

The said means acting on the parallelogram linkages are constituted by a roller provided at the end of one of the said extensions and co-operating with a dog or the like which preferably is movable in perpendicular relationship to the plane of the parallelogram linkage or linkages.

According to another form of embodiment, the said active member is constituted by a T-shaped member, the horizontal portion of which is hingedly connected at both ends to the said extensions and whose vertical portion is retained on a driving chain parallel to both conveyor chains and adjustable with respect to the latter.

Furthermore, the vertical portion of the said T-shaped member constitutes a gripper or nipper including a first, stationary leg integral with or secured to the horizontal portion of the said T-shaped member and a second leg hingedly connected to the latter and biased by a spring towards the first leg so as to grip a pin or the like connected to the said driving chain.

Furthermore, a push means, such as for example a fluid-operated actuator, on the said T-shaped member is provided to open the gripper and therefore the deformable parallelogram linkage or linkages.

BRIEF DESCRIPTION OF THE DRAWINGS

Other advantages and features of the invention will appear more clearly as the following detailed description proceeds with reference to the appended drawings given solely by way of example and wherein:

FIG. 1 is a diagrammatic plan and top view of a conveyor according to the invention;

FIG. 2 is an enlarged sectional view of the conveyor substantially upon the line II—II of FIG. 1, the said sectional view diagrammatically illustrating the heat-sealing station;

FIGS. 5 to 8 are diagrammatic top views illustrating various deformations of a parallelogram linkage for retaining containers of various shapes or dimensions;

FIG. 9 is a diagrammatic partial top view of the conveyor, illustrating another form of embodiment of the means for operating or actuating the deformable parallelogram linkages which, in this Figure, are shown in their closed, container-retaining position;

FIG. 10 is a view similar to FIG. 9, but showing the deformable parallelogram linkages in their open, container-releasing position;

FIG. 11 is a view in the direction of arrow III of FIG. 10, showing the parallelogram linkage opening means;

FIG. 12 is a diagrammatic partial top view of the conveyor fitted with another parallelogram linkage actuating means;

FIG. 13 is a top view illustrating a particular design of this means for actuating the deformable parallelogram linkages, which in this case are shown in the closed position; and FIG. 14 is another top view of the said particular design after actuation by push means to open the parallelogram linkages.

DESCRIPTION OF THE PREFERRED EMBODIMENTS

Figure 3:
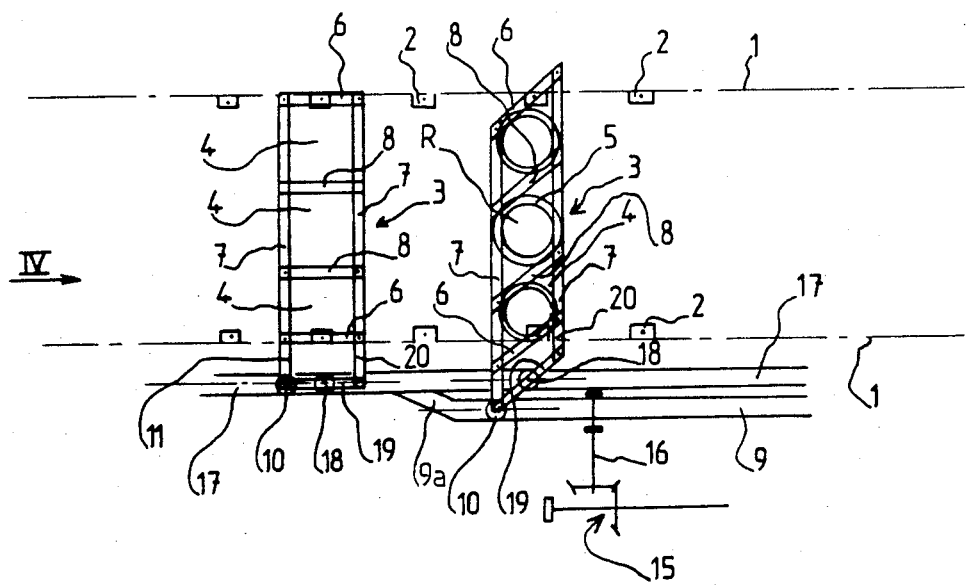
FIG. 3 is a partial top view of the conveyor corresponding to the portion designated by III in FIG. 1 and illustrating another parallelogram linkage actuating system.
Figure 4:
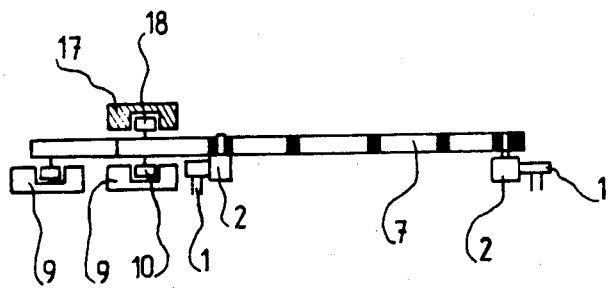
FIG. 4 is an end view of the conveyor in the direction of arrow IV of FIG. 3.

According to one example of embodiment and referring particularly to FIGS. 1 and 3, a conveyor according to the invention includes essentially two endless chains 1 provided with pivot pins 2 on which are mounted transverse members 3, each constituted by an assembly of links hingedly connected to each other and to the pivot pins 2 of the chains 1, so as to define one or more deformable parallelogram linkages 4, each adapted to retain a container or cup R.

Each container R rests through its flange 5 on the links of a deformable parallelogram linkage 4.

According to the example illustrated in FIGS. 1 and 3, the transverse members 3 include three parallelogram linkages 4 consisting of a first parallelogram linkage including two opposite sides 6 pivotally mounted on the corresponding pivot pins 2 of the chain 1, and two other opposite sides 7 between which are hingedly connected two links 8.

As appears from FIG. 1 and according to one example of embodiment, the deformation of the parallelogram linkages 4 of each transverse member 3 is ensured by a rail 9 which extends in the longitudinal direction of the conveyor and in which is adapted to roll a roller 10 mounted at the end of an extension 11 of one of the sides 7 of the parallelogram linkage constituted by the two sides 7 and the two sides 6 hingedly connected at 2 to the chains 1.

The rail 9 includes bends such as 9a, 9b, to allow the deformation of the parallelogram linkages 4 when the chains 1 are driven, the said bends allowing either the closing of the parallelogram linkages 4 so as to retain the containers R or the release of the said containers, as will be described later in connection with the operation of the conveyor.

The rail 9 may include one or several portions such as 12 which are displaceable with respect to the remaining portion of the said rail by being for example hingedly connected at 13 to the said remaining portion.

The rail 9 is adjustable by any appropriate manual or automatic means in a perpendicular direction to the longitudinal direction of the conveyor defined by the chains 1, which means may be constituted, as illustrated in FIG. 1, by crank means 14, which, through the medium of bevel pinions 15 and a connection 16 with the rail 9, allows displacing the latter in the direction indicated above.

With the rail 9 may be associated another rail 17 which is stationary and rectilinear as shown in FIG. 3. In the rail 17 is adapted to roll a roller 18 which is mounted on a link 19 hingedly connected, on the one hand, to the end of the extension 11 mentioned earlier and to the end of another extension 20 of the other side 7 of the first parallelogram linkage formed by the sides 7 and 6. Otherwise stated, the link 19, the extensions 11 and 20 and one of the links 6 define a parallelogram linkage which receives no containers R and serves as a means for deforming the parallelogram linkages 4.

There will now be described the operation of the conveyor which may be used for example to automatically fill and close cups R intended to contain a food product.

Considering FIG. 1 from left to right, it is seen that the hinged parallelogram linkages 4 of the transverse members 3 are opened and thereafter deformed under the action of the bend 9a so as to receive the cups R from a cup supply station A located above the conveyor. Of course, the degree of deformation of the parallelogram linkages 4 depends on the position of the rail 9 which is adjusted according to the shape of the containers R to be processed.

Thereafter, the cups reach the station B, where they are filled, and then the station C to receive a cover O as seen in FIG. 2.

Thereafter, the cups R reach the station D, which is a heat-sealing station. As seen in FIG. 2, the cups reaching this station rest by their bottom portion on a plate 21 which is connected to the frame 22 of the machine through the medium of a bar, rod, stem or the like 23. It will be observed that, at station D, the portion 12 of the rail 9 is shifted to open the parallelogram linkages 4 and therefore to place the cups on the plate 21. A cylindrical support used as a counter-electrode 24 is then actuated by any appropriate means, such as for example a fluid-operated actuator, from a position shown in phantom lines to a position represented in full lines in FIG. 2, by sliding the same along the bar 23 supporting the plate 21. The cylindrical support 24 is moved through the previously opened parallelogram linkage 4 and raises the container R by acting on the underside of its flange 5 to apply the latter to a stationary heat-sealing head 25. The cover O is thus correctly welded to the flange 5 of the containers R, whereafter the cylindrical support 24 is lowered and the parallelogram linkages 4 are deformed to allow the flange 5 of the containers to again rest on the links 6, 7 and 8 defining the parallelogram linkages 4. Lastly, the rows of cups R are conveyed further until the parallelogram linkages 4 are again opened on passing along the other bend 9b of the rail 9, thus allowing the cups to be freed and then discharged from the conveyor by any suitable seizing or ejecting means.

Referring now to FIGS. 5 to 8, it is seen that a conveyor complying with the invention is capable of conveying and maintaining cups R of any shape while at the same time ensuring a perfect centering thereof with respect to the various stations located above the conveyor.

By way of example, FIG. 5 shows a container R with a rectangular opening, FIG. 6 shows a container R with a substantially square opening, and FIGS. 7 and 8 show containers R of circular shape of different diameters which can be supported by the conveyor of the invention, provided that appropriate degree of deformation of the linkages 4 is selected by simply shifting the rail 9 as explained previously. It will be noted in this connection that the roller 18 rolling in the stationary rail 17 (FIG. 3) advantageously serves as a positive pivot point preventing any traction from casually being exerted on the chains 1 when the roller 10 passes along a bend 11 of the rail 9 and therefore exerts a push or a traction on the linkages 6, 7 and 8 of each transverse member 3 of the conveyor.

Reference is now made to FIGS. 9 to 14 which show other particularly simple and reliable linkage actuating means.

As seen in FIGS. 9, 10 and 12 to 14, an active member 30 connects to each other the extensions 11, 20 of the two opposite sides 7 of the deformable parallelogram linkages 4, the said member allowing the opening and closing of said linkages.

According to the form of embodiment illustrated in FIGS. 9 and 10, the active member 30 is constituted by a spring 31 automatically returning the linkages 4 to their closed position on the containers R, as is clearly seen in FIG. 9. Instead of the spring 31, there may as well be provided, without departing from the scope of the invention, a simple resilient connection, e.g. of rubber, attached by its ends between the extensions 11 and 20. Furthermore, such a spring or resilient connection 31 may be provided either at only one of the ends of the row of linkages 4 or at both ends of said row, as seen in FIGS. 9 and 10. It will be observed that the ends 31a and 31b of the spring or resilient connection 31 by which the latter is attached to the extensions 11 and 20 are shifted with respect to each other, i.e. differently spaced from the hinged connections of the link 6 to the sides 7 so as to urge the linkages 4 back to their closed position.

At the end of the extension 20 projecting from one side of the chains 1 and, if appropriate, at the end of the extension 11 projecting from the other side of the chains 1, is provided a roller 32 adapted to co-operate with a dog or cam 33 shown in FIGS. 10 and 11. The cam 33 is movable in perpendicular relationship to the plane of the parallelogram linkages 4 and is provided, for example, with an inclined surface 34 which, in co-operating with the roller 32, pushes one of the sides 7 against the return force of the spring or resilient connection 31, thus opening the parallelogram linkages 4 and releasing the containers R.

According to the modification illustrated in FIG. 12, the active member 30 for actuating the parallelogram linkages 4 consists of a T-shaped member, the horizontal portion 35 of which is hingedly connected at its ends 36 to the extensions 11 and 20, whereas the vertical portion 37 of the said T-shaped member is retained on a driving chain 38 parallel to the conveyor chains 1 proper and adjustable with respect to both of these chains. It is therefore understood that the linkages 4 will be opened or closed depending on the position in which the said member is retained on the chain 38.

A preferred form of embodiment of the said T-shaped member will now be described with reference to FIGS. 13 and 14 in which it is seen that the vertical portion 37 of the T-shaped member is designed in the form of a nipper, pincers or a gripper. The said pincers include a first leg 39 integral with the horizontal portion 35 and a second leg 40 hingedly connected at 41 to the portion 35 and biased towards the first leg 39 by a spring 42 attached at both its ends 43 to the second leg 40 and to the horizontal portion 35 of the T-shaped member, respectively.

The pincers or nipper constituted by the two legs 39, 40 seize a finger 44 connected to the chain 38.

Thus, as seen in FIG. 13, the position of the chain 38 with respect to the chains 1 is such that the T-shaped member 37 is inclined, a position which corresponds to a closed position of the linkages 4, which can thus retain a container R by its flange 5.

In order to release the container R, it is sufficient, as shown in FIG. 14, to provide a push means represented by the arrow F and consisting for example of a fluid-operated actuator, which means, by acting on the horizontal portion 35, ensures the opening of the nipper and of the parallelogram linkages 4 as the leg 40 remains in abutment against the finger 44 of the chain 38.

There is therefore obtained, according to the invention, a chain conveyor with transverse members constituted by parallelogram linkages adapted to receive containers of any shapes while at the same time maintaining them perfectly centered, and which allow changing very easily from the processing of containers of a certain shape to the processing of containers of another shape.

Of course, the invention is by no means limited to the forms of embodiment described and illustrated which have been given by way of example only.

For example, any number of parallelogram linkages of each transverse member of the conveyor and any means for the deformation of the said linkages may be used without departing from the scope of the invention.

Therefore, the invention includes all technical equivalents to the means described as well as their combinations if the latter are carried out according to its gist.

What is claimed is:

1. A conveyor for containers such as cups, comprising:
   two endless chains provided with transverse members connected to both chains and adapted to receive and carry the containers;
   said members each comprising at least four hinged links hingedly connected to one another to constitute at least one deformable parallelogram linkage including
   two first opposite links (6) hingedly connected to the two chains respectively, and
   two second oppsite links (7) hingedly connected to said two first opposite links respectively; and
   means for moving said two first and two second opposite links relative to each other so as to accommodate the containers therebetween.

2. A conveyor according to claim 1, which further comprises
   additional links (8) hingedly connected between said second opposite links (7) of said deformable parallelogram linkage to thus provide a plurality of parallelogram linkages each adapted to receive and accommodate one container.

3. A conveyor according to claim 1, wherein
   said two second opposite links (7) comprise extension portions (11, 20) respectively,
   spring means (31) are provided for interconnecting said portions (11,20), and
   a cam or the like (33) is provided for co-operating with at least one of said portions (11,20) to act upon said parallelogram linkage against the action of said spring means for opening said parallelogram.

4. A conveyor according to claim 3, which further comprises
   additional links (8) hingedly connected between said second opposite links (7) of said deformable parallelogram linkage to thus provide a plurality of parallelogram linkages each adapted to receive and accommodate one container.

5. A conveyor according to claim 1, wherein
   said two second opposite links (7) comprise extension portions (11,20) respectively,
   a T-shaped member having a horizontal portion (35) and a vertical portion (37) is hingedly connected to said extension portions (11,20) through ends (36) of said horizontal portion (35), and
   a driving chain (38) substantially parallel to said two conveyor chains is provided for retaining said vertical portion (37) of said T-shaped member.

6. A conveyor according to claim 5, wherein
   said vertical portion (37) of said T-shaped member constitutes pincer or nipper means including
   a first, stationary leg (39) integrally connected to said horizontal portion (35) of said T-shaped member,
   a second leg (40) hingedly connected to said horizontal portion (35), and
   a spring (42) biasing said second leg (40) towards said first leg (39), to thus seize a finger (44) connected to said driving chain (38).

7. A conveyor according to claim 5, which comprises
   push means for acting on said T-shaped member to cause the opening of said pincer means and of said parallelogram linkage.

8. The conveyor of claim 7, wherein said push means comprise a fluid-operated actuator.

9. A conveyor according to claim 5, which further comprises
   additional links (8) hingedly connected between said second opposite links (7) of said deformable parallelogram linkage to thus provide a plurality of parallelogram linkages each adapted to receive and accommodate one container.

10. A conveyor according to claim 1, wherein
    said means for moving said two first (6) and two second (7) opposite links comprise
    a rail (9) which is adjustable in a substantially perpendicular direction to the longitudinal direction of said conveyor, and
    a member (10) connected to one of said two second opposite links (7) for rolling or sliding in said rail (9), said rail (9) comprising
    at least one portion (12) which is displaceable with respect to the remaining portion of said rail (9).

11. A conveyor according to claim 10, which further comprises
    a second stationary rail (17) extending in a substantially parallel relationship to said adjustable rail (9), and
    a link (19) provided for hinged connection between said two second opposite links (9), said link including
    a roller (18) for rolling on said stationary rail (17).

12. A conveyor according to claim 10, which further comprises
    additional links (8) hingedly connected between said second opposite links (7) of said deformable parallelogram linkage to thus provide a plurality of parallelogram linkages each adapted to receive and accommodate one container.

13. The conveyor of claim 10, wherein said member (10) is a roller.

* * * * *